No. 770,743.

Patented September 27, 1904.

UNITED STATES PATENT OFFICE.

EMIL FISCHER, OF BERLIN, GERMANY, ASSIGNOR TO THE FIRM OF E. MERCK, OF DARMSTADT, GERMANY.

PROCESS OF MAKING DIALKYLBARBITURIC ACIDS.

SPECIFICATION forming part of Letters Patent No. 770,743, dated September 27, 1904.

Application filed January 27, 1904. Serial No. 190,806. (No specimens.)

*To all whom it may concern:*

Be it known that I, EMIL FISCHER, a subject of the Emperor of Germany, residing at Hessischestrasse No. 2, Berlin N., Germany, have invented certain new and useful Improvements in Processes of Preparing Dialkylbarbituric Acids, of which the following is a clear, full, and exact description.

My invention relates to a process of preparing dialkylbarbituric acids; and my invention is to improve upon the processes for producing such acids.

My invention will be defined in the claims.

Whereas a mixture of dimethylmalonic acid and urea may be converted into a so-called "dimethylbarbituric" acid by treatment with phosphorus oxychlorid, this treatment if applied to diethyl, dipropyl, and other dialkyl malonic acids still richer in carbon results in the formation of ureides of the dialkylacetic acids with the simultaneous evolution of carbonic acid. I have found that the synthesis of the dialkylbarbituric acids is quite easily accomplished if the dialkylmalonic acids are first converted into dialkylmalonyl chlorids by the action of, *e. g.*, phosphorus chlorid and these when treated, preferably by heating, with urea.

This new process is based upon the reaction which takes place as in the following equation:

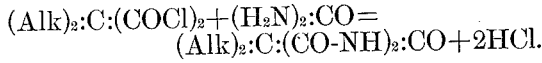

$(Alk)_2:C:(COCl)_2 + (H_2N)_2:CO = (Alk)_2:C:(CO\text{-}NH)_2:CO + 2HCl.$

In the above illustrative equation it is understood that the two alkyls may be alike or different.

The following show examples of my process where a dialkylmalonic chlorid is used.

*Example 1 — Diethylbarbituric acid.*—
Three parts of diethylmalonyl chlorid are heated with 1.9 parts of finely-powdered and dried urea for twenty hours in a water-bath. During the last few hours considerable hydrochloric acid is evolved, and there finally remains a solid mass which when recrystallized from hot water yields pure diethylbarbituric acid. The operation may be simplified by heating in an oil-bath to about 120° centigrade, as then less time is required for the reaction to be effected.

*Example 2—Dipropylbarbituric acid.*—In order to prepare dipropylbarbituric acid from dipropylmalonyl chlorid, two parts of the acid are heated with one part of powdered dried urea for eighteen hours in a water-bath and then for a further five hours in an oil-bath at 135° centigrade. In this process, too, hydrochloric acid is evolved. The slightly-colored residue is dissolved in boiling water. On cooling dipropylbarbituric acid separates in the form of colorless crystals, melting at 146° centigrade, (corr.)

*Example 3 — Dimethylbarbituric acid.*— Five parts of dimethylmalonyl chlorid are heated with 2.66 parts of powdered dried urea first for ten hours in the water-bath and then for a further two hours in the oil-bath to 130° centigrade. The evolution of hydrochloric acid will then have entirely ceased, and the solid residue on recrystallizing from hot water yields pure dimethylbarbituric acid, melting at 278° centigrade, (corr.) One advantage this process has over the older method of preparing previously so-called "dimethylbarbituric" acid from dimethylmalonic acid and urea by treatment with phosphorus oxychlorid is that it affords a larger yield.

The acids specified in the first two examples have been claimed by me in a separate application, Serial No. 140,108, filed January 22, 1903.

What I claim is—

1. The process of preparing a dialkylbarbituric acid, which consists in causing a chemical reaction between a dialkylmalonyl chlorid and urea.

2. The process of preparing a diethylbarbituric acid, which consists in causing a chemical reaction between a diethylmalonyl chlorid and urea.

3. The process of preparing a diethylbarbituric acid, which consists in heating a diethylmalonyl chlorid with urea, and purifying said acid.

Signed at Munich, Bavaria, this 28th day of December, 1903.

EMIL FISCHER.

Witnesses:
 ABRAHAM SCHLESINGER,
 HERMANN M. SCHELLING.